June 1, 1971   R. F. TAYLOR ET AL   3,582,288
CHEMICAL REACTOR VESSELS
Filed May 8, 1968   3 Sheets-Sheet 1

United States Patent Office 3,582,288
Patented June 1, 1971

3,582,288
CHEMICAL REACTOR VESSELS
Royston Frank Taylor, Reading, and Thomas Rhys Jenkins, East Hendred, England, assignors to United Kingdom Atomic Energy Authority, London, England
Filed May 8, 1968, Ser. No. 727,495
Claims priority, application Great Britain, May 11, 1967, 22,041/67
Int. Cl. B01j 1/00, 9/18; F26b 17/10
U.S. Cl. 23—284
3 Claims

ABSTRACT OF THE DISCLOSURE

A gas/solids reactor vessel in the form of a horizontal trough with a porous base plate through which is a gas flow. The vessel is vibrated normal to the base plate and solids introduced at one end move along the trough and out over a weir at the other end. A purge gas flows transversely across the top surface of the solids within the vessel, the inlet and outlet for the purge gas being adjacent opposite ends of the trough.

BACKGROUND OF THE INVENTION

The present invention relates to improvements in reactor vessels for carrying out chemical reactions. It should be understood that the term chemical reactions is to be widely construed as including such reactions as drying or sintering as well as more normal chemical reactions.

In the carrying out of chemical reactions with solids it is often desirable to use the solids in particulate or powder form and to contact the solids with a gas, either for heating purposes or as part of the reactants or, indeed, merely to provide thorough mixing of the reactant solids. To this end the well known fluidised bed reactor has been proposed but unfortunately it is difficult to operate a fluidised bed in such a way that all the particles have substantially the same residence time. Indeed, this can only be arranged in fluidised bed reactors by operating it on the batch principle which is undesirable.

It is an object of the present invention to provide an improved reactor vessel.

SUMMARY OF THE INVENTION

According to the present invention there is provided a reactor vessel including solids inlet and outlet means and gas inlet and outlet means, so located that the gas passes upwardly through the solids, and means to vibrate the reactor vessel in the vertical plane.

The effect of the vibration is to cause what would otherwise be a static bed of solids to expand slightly and the same effect is provided by the upward flow of gas. However, these two factors operate in a different way on the particles in the bed and so by suitable adjustment of the two factors different effects may be achieved.

In the preferred arrangement the reactor vessel is in the form of a substantially horizontal tube which is provided with a porous base plate arranged along a chord of the tube, thereby to define a horizontal trough. The gas flow is provided from beneath the porous base plate and the whole reactor vessel is vibrated substantially normally to the base plate. Under these arrangements the reactant material can be fed into one end of the tube and can be caused to progress down a vibration gradient to the other end of the tube where it is withdrawn. The speed of flow of the reactant material is, in general, controlled by a suitable adjustment of the vibration period and amplitude and the upward flow of gas. It can also be desirable in this arrangement to provide an additional gas inlet such that there is a continuous flow of gas crossing the top of the tube above the reactant material either in the co- or counter-current direction to assist in sweeping away reaction products or for other purposes.

BRIEF DESCRIPTION OF THE DRAWINGS

In order that the invention may more readily be understood one embodiment of the same will now be described by way of example and with reference to the accompanying drawings, wherein.

DESCRIPTION OF THE PREFERRED EMBODIMENT

Figures 1, 2, 6:
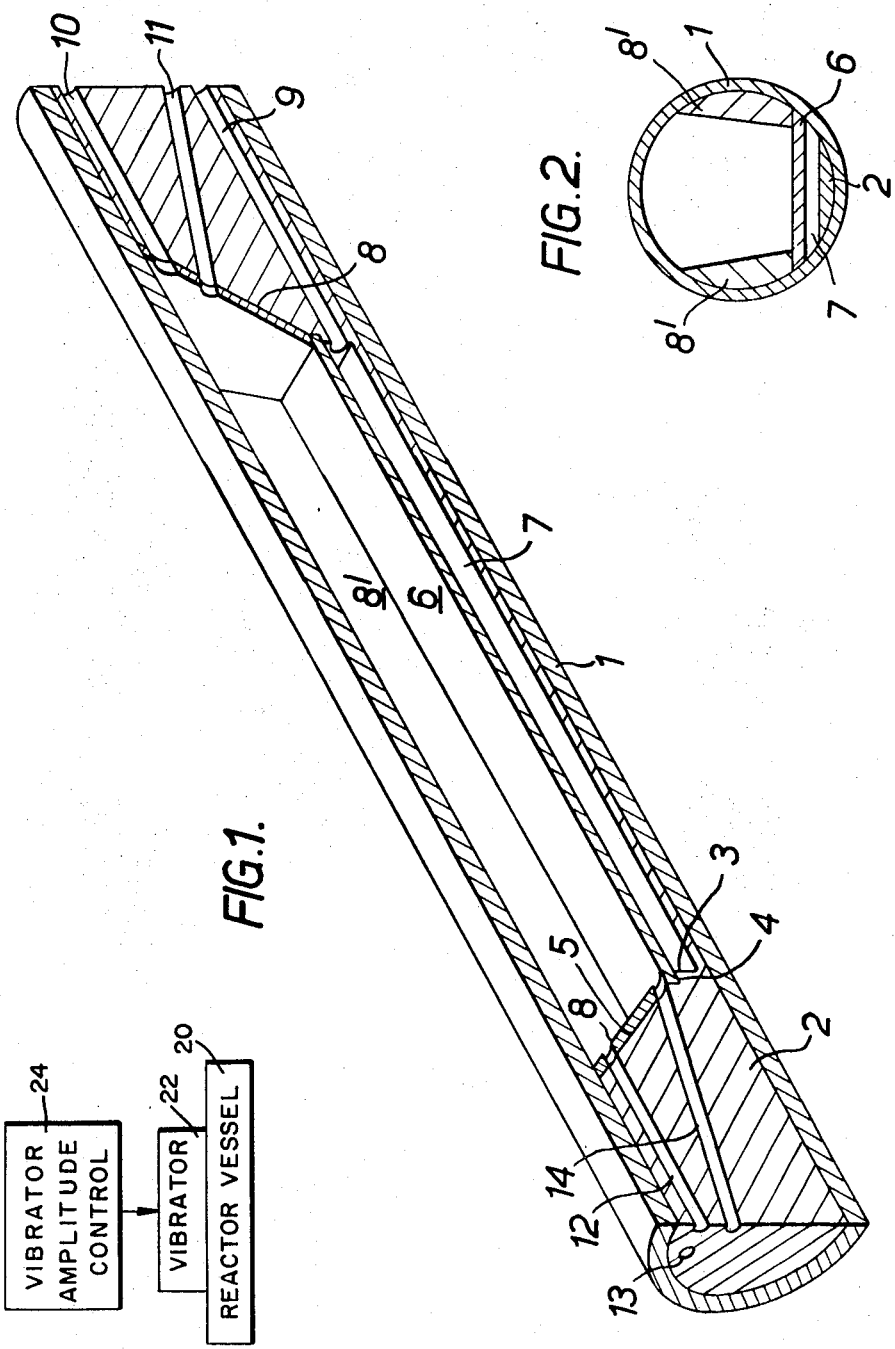
FIG. 1 is a diagrammatic perspective cut-away view of a reactor vessel.
FIG. 2 is an outline transverse section through the vessel of FIG. 1.
FIG. 6 is a schematic block diagram of the vibratory system for the vessel.

Referring now to FIG. 1 of the drawings, the reactor vessel illustrated is made of graphite and comprises a cylindrical sleeve 1 which is mounted by a suitable means (not shown) so as to be generally horizontal. Located within this sleeve 1 is a cylindrical member 2 which is cut-away at its central portion so as to provide the reactor vessel proper. As will be seen, the end of the cut-away portion comprises a substantially vertical portion 3 above which is a horizontal step 4 and an inclinded face 5. A porous rectangular graphite plate 6 is supported upon the horizontal step 4 so as to be spaced above the base of the cylindrical member 2 by the height of the edge 3 thereby to define a gas plenum chamber 7. In order to keep the plate 6 in position, end plates 8 are provided at each end and side plates 81 are provided at the sides, thereby to define a substantially rectangular trough.

A bore 9 passes through the member 2 and gives access to the gas plenum chamber 7 and provides for the inlet of fluidising gas to below the plate 6. A similar bore 10 spaced above the bore 9 provides for the inlet of sweep gas whilst an inclined bore 11 situated between bores 9 and 10 provides for the outlet of reactant solids. At the other end of the reactor, a bore 12 substantially identical to the bore 10 is provided as a gas offtake and this may be supplemented by a further bore 13. An inclined bore 14 passing to adjacent the base plate 6 and below the bore 12 provides for the inlet of solids.

In operation, the reactor vessel is heated by means, e.g. induction heating (not shown), if such heating is desirable, and gas is passed through bore 9 to the gas plenum chamber 7. Simultaneously, a counter current sweep of gas enters through bore 10. The reactant solids in powder form are fed in through the bore 14 whilst the reactor vessel as a whole is being vibrated in the vertical plane. Thus reactant solids in the form of a semi-fluidised or expanded bed pass gradually along the reactor and leave through the bore 11, the portion of plate 8 below bore 11 forming a weir. The conditions can be arranged so that there is substantially no longitudinal mixing of the reactant solids, whereby all the solids have substantially the same residence time in the reactor.

FIG. 6 shows a reactor vessel denoted 20 and an associated vibrator 22 for imparting vertical vibrations to vessel 20. Vibration amplitude control means 24 control the amplitude of the vibrations imparted to vessel 20 by a vibrator 22. The vibrator 22 and amplitude control means 24 may take a number of conventional forms and because the construction of these devices forms no part of the invention further description thereof is deemed unnecessary.

In order to assist in the control of the flow of reactant solids through the reactor, it may be desirable to divide the bed by means of vertical weirs extending upwardly from the plate 6 and/or vertical baffles extending downwardly towards the plate 6 It may also be desirable to divide the plenum chamber 7 into a plurality of sections and to provide separate gas flows to each of these sections. Clearly, it is possible to provide these separate gas flows by tapping the various sections between the baffles above the plate 6.

In experiments with a vessel as above described, we have found that the purge gas flow, i.e. that entering through bore 10 for counter-current flow or through bore 12 for co-current flow, has substantially no effect on the residence time but clearly affects the efficiency of contacting by the gas flow through the bed. Similarly with a constant gas purge flow, increasing the fluidising gas flow above a minimum has little effect on the solids throughput or gas contacting efficiency.

Figure 3:
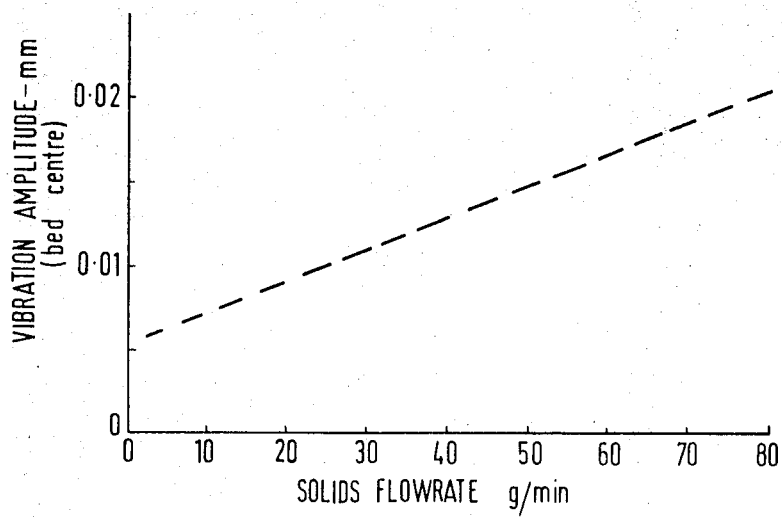
FIGS. 3 and 4 are graphs showing the solids flow behaviour in the vessel.
Figure 4:
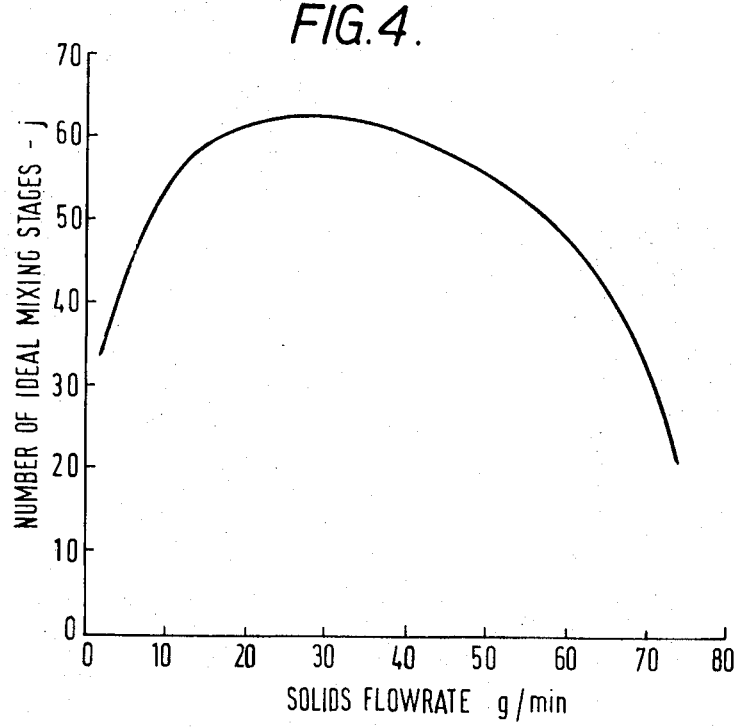

On the other hand, FIG. 3 which is a plot of vibration amplitude in mm. vs. solids flow rate in g./min. shows the clear control over throughput that can be achieved by controlling the vibration amplitude. Similarly FIG. 4 shows that the efficiency of the reactor as a gas/solids contactor as shown by the number of ideal mixing stages rises to a marked maximum at a specific solids flow rate and hence vibration amplitude.

Figure 5:
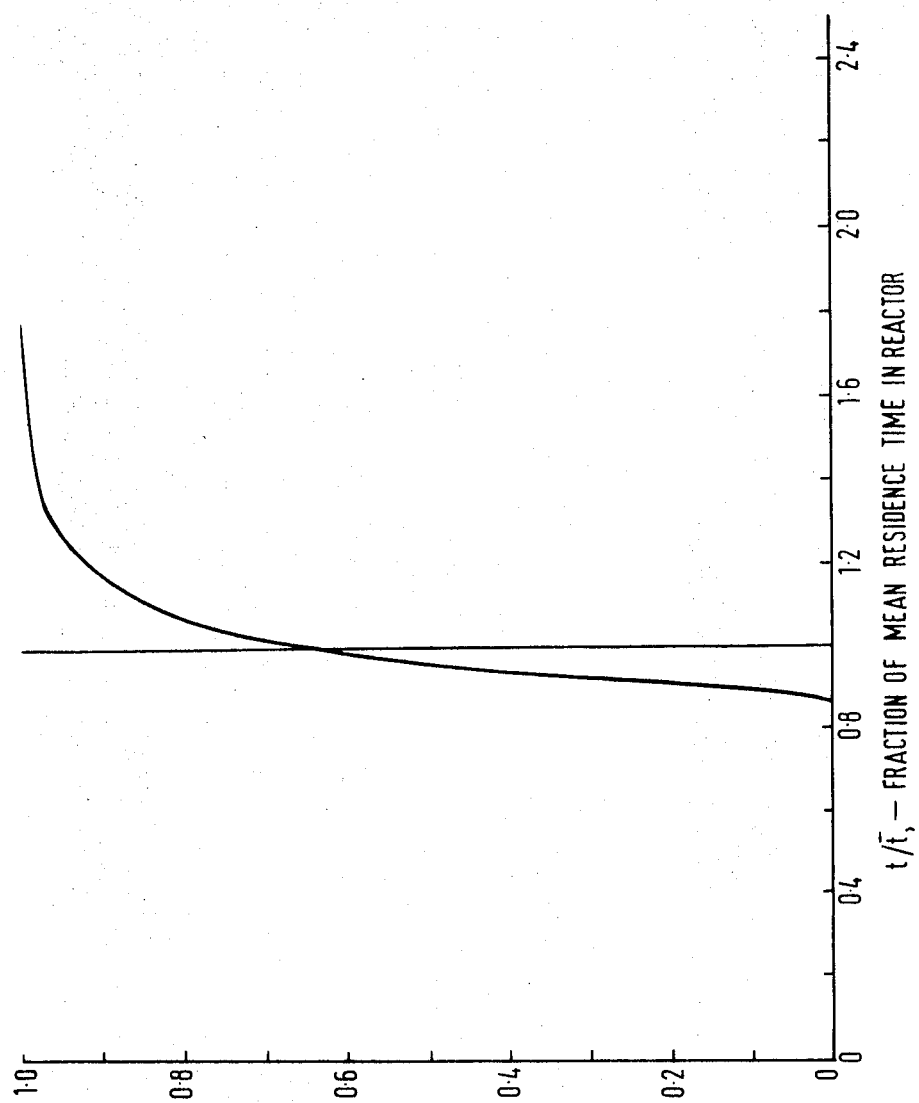
FIG. 5 is a graph showing solids residence time distribution.

In order to demonstrate the fact that there is little longitudinal mixing, FIG. 5 plots the fraction of mean residence time $t/\bar{t}$ against the fraction of the product with an age less than $t/\bar{t}$. The vibration conditions were such tha the bed had 60 ideal mixing stages The experiments resulting in the data of FIGS. 3 to 5 were carried out using 0.5 mm. copper shot.

Although the invention has ben described with reference to a horizontal reactor it can also be applied to a vertical reactor but in this case, the solids will pass downwardly in counter-current to the gas flow and the vibration will be applied vertically. Such an arrangement can be used to give good flow of the solids whilst maintaining the gas flow at a velocity below that which is normally possible if the bed is to be partially fluidised or expanded.

A further development of the technique of applying an upward gas flow in combination with vertical vibration can be utilised to develop a valve system. Thus, if the base of the above described vertical reactor is in the form of downwardly directed cone or indeed, if any other vessel has its base in the form of a downwardly directed cone, it is known that the minimum orifice size should be of the order of six times the particle diameter to insure free flow of the solids through the orifice at the base of the cone. In many cases an orifice of this size provides an unacceptably large flow through the orifice and it is necessary to insert a valve member in the form of an upwardly directed cone to control the actual flow. However, we have now discovered that if an upward gas flow is established through the orifice and at the same time a vertical vibration is applied to the cone in the region of the orifice, these two factors will combine together to act as a mechanical valve controlling the orifice. Thus, by a variation in the gas flow rate and period and amplitude of the vibration, the flow of solids through the orifice can be controlled over extremenly wide limits.

We claim:

1. A reactor vessel comprising solids inlet and outlet means located for flow of solids under gravity from inlet to outlet, fluidizing gas inlet and outlet means located for upward gas flow through the vessel, purge gas inlet and outlet means located for transverse flow of purge gas across the top surface of the solids within the vessel, means for vibrating the vessel in a vertical direction, and flow rate control means for controlling the rate of flow under gravity of solids through the vessel, said flow rate control means comprising means for controlling the amplitude of vibration imparted to the vessel.

2. A reactor vessel according to claim 1, said vessel being constructed in the form of a generally horizontal trough, and including a porous base to such trough, said solids inlet and outlet means being adjacent opposite ends of the said trough, the fluidizing gas flow being upwardly through the said base, and the said purge gas inlet and outlet means being adjacent said opposite ends of the said trough.

3. A reactor vessel according to claim 2, including a weir adjacent the solids outlet to define the level of solids in the vessel.

References Cited

UNITED STATES PATENTS

| | | | |
|---|---|---|---|
| 2,542,587 | 2/1951 | Smith | 23—288(.35) |
| 2,641,849 | 6/1953 | Lintz | 23—288X(.35) |
| 2,667,706 | 2/1954 | Morse | 23—288X(.35) |
| 2,668,041 | 2/1954 | Knibbs | 23—288X(.35) |
| 2,856,273 | 10/1958 | Beber et al. | 34—57X(A) |
| 2,876,557 | 3/1959 | Ducatteau | 23—288UX(.35) |
| 3,089,253 | 5/1963 | Evans | 34—57(A) |
| 3,161,483 | 12/1964 | Morris | 34—57(A) |

FOREIGN PATENTS

| | | | |
|---|---|---|---|
| 68,336 | 7/1951 | Netherlands | 23—288.35 |

OTHER REFERENCES

"Some Properties of a Vibrating Fluidized Bed," British Chemical Engineering, vol. 11, No. 3, March 1966, p. 226.

MORRIS O. WOLK, Primary Examiner

B. S. RICHMAN, Assistant Examiner

U.S. Cl. X.R.

23—288; 34—57